US009912025B2

(12) United States Patent
Schaffnit

(10) Patent No.: US 9,912,025 B2
(45) Date of Patent: Mar. 6, 2018

(54) USAGE OF REGENERATIVE BRAKE POWER FOR SYSTEM RESTART IN START-STOP OPERATION OF FUEL CELL HYBRID VEHICLES

(75) Inventor: Jochen Schaffnit, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 1278 days.

(21) Appl. No.: 12/816,596

(22) Filed: Jun. 16, 2010

(65) Prior Publication Data

US 2011/0311894 A1 Dec. 22, 2011

(51) Int. Cl.

| | |
|---|---|
| ***H01M 8/04*** | (2016.01) |
| ***H01M 16/00*** | (2006.01) |
| ***B60L 7/10*** | (2006.01) |
| ***B60L 11/18*** | (2006.01) |
| ***H01M 8/04089*** | (2016.01) |
| ***H01M 8/04537*** | (2016.01) |
| ***H01M 8/04746*** | (2016.01) |
| ***H01M 8/04858*** | (2016.01) |
| ***H01M 8/04828*** | (2016.01) |

(52) U.S. Cl.

CPC ............ *H01M 16/006* (2013.01); *B60L 7/10* (2013.01); *B60L 11/1885* (2013.01); *H01M 8/0488* (2013.01); *H01M 8/04089* (2013.01); *H01M 8/04559* (2013.01); *H01M 8/04753* (2013.01); *H01M 8/04888* (2013.01); *H01M 8/04947* (2013.01); *Y02T 90/34* (2013.01)

(58) Field of Classification Search

CPC .......... H01M 16/006; H01M 8/04089; H01M 8/04559; H01M 8/04753; H01M 8/0488; H01M 8/04888; H01M 8/04947

USPC .............. 429/455, 12, 13, 429–451; 903/947

See application file for complete search history.

(56) References Cited

U.S. PATENT DOCUMENTS

| | | | | |
|---|---|---|---|---|
| 5,998,885 | A * | 12/1999 | Tamor et al. | 307/10.1 |
| 7,862,943 | B2 | 1/2011 | Hortop | |
| 2004/0013920 | A1* | 1/2004 | Hasuka et al. | 429/23 |
| 2005/0057098 | A1* | 3/2005 | Bouchon | 307/10.1 |
| 2005/0202292 | A1* | 9/2005 | Richards et al. | 429/22 |
| 2008/0087479 | A1* | 4/2008 | Kang | 429/9 |
| 2011/0008689 | A1* | 1/2011 | Milacic et al. | 429/413 |

* cited by examiner

*Primary Examiner* — Jimmy K Vo

(74) *Attorney, Agent, or Firm* — John A. Miller; Miller IP Group, PLC

(57) ABSTRACT

A system and method are disclosed for using regenerative braking power to start a fuel cell stack for system restart during a start/stop operation of a fuel cell hybrid vehicle. The method includes disconnecting the fuel cell stack from a high voltage bus for the start/stop operation and using regenerative braking power provided by an electric traction system to recharge a battery in the hybrid vehicle during the start/stop operation. The method also includes reconnecting the fuel cell stack to the high voltage bus and providing at least some of the regenerative braking power from the electric traction system to a compressor that provides cathode air to the fuel cell stack when the stack is reconnected to the high voltage bus at the end of the start/stop operation. A bi-directional DC converter selectively distributes the power to the compressor and the battery.

14 Claims, 2 Drawing Sheets

10 18 28 14 26 22 20 16 32 30 34 24 12

USAGE OF REGENERATIVE BRAKE POWER FOR SYSTEM RESTART IN START-STOP OPERATION OF FUEL CELL HYBRID VEHICLES

BACKGROUND OF THE INVENTION

1. Field of the Invention

This invention relates generally to a system and method for using regenerative braking power to start a fuel cell stack and, more particularly, to a system and method for using regenerative braking power during a start/stop operation of a fuel cell hybrid vehicle to restart a fuel cell stack.

2. Discussion of the Related Art

Most fuel cell vehicles are hybrid vehicles that employ a rechargeable supplemental high voltage power source in addition to the fuel cell stack, such as a DC battery or an ultra-capacitor. The power source provides supplemental power for the various vehicle auxiliary loads, for system start-up and during high power demands when the fuel cell stack is unable to provide the desired power. More particularly, the fuel cell stack provides power to an electric traction motor that drives the vehicle and other vehicle systems through a high voltage bus for vehicle operation. The battery provides the supplemental power to the voltage bus during those times when additional power is needed beyond what the stack can provide, such as during heavy acceleration. For example, the fuel cell stack may provide 70 kW of power. However, vehicle acceleration may require 100 kW or more of power. The fuel cell stack is used to recharge the battery at those times when the fuel cell stack is able to meet the system power demand.

Regenerative braking can cause the electric traction motor in the electric hybrid vehicle to operate as a generator to convert rotational energy from the vehicle wheels to electrical power that can be used to charge the battery in a manner that is well understood by those skilled in the art. However, in known electrical vehicles, the collection of regenerative braking power is prevented during fuel cell system starts.

Some hybrid vehicles employ a start/stop mode where only battery power is used to provide the power demands for the vehicle, where the fuel cell stack is disconnected from the high voltage bus. For example, during idle conditions when low power is required, the fuel cell stack may be disconnected from the high voltage bus and the cathode compressor may be turned off, or at least operated at a low speed. Further, during long travel downhill where significant regenerative braking may be provided, fuel cell stack power may not be required and the fuel cell stack can be disconnected from the high voltage bus for at least a certain amount of time.

At some point it becomes necessary to reconnect the fuel cell stack to the high voltage bus because more power is necessary, the internal temperature of the stack has fallen to some minimum temperature, or some other system requirement has been met. In known start/stop modes, battery power is used to spin up the cathode compressor and provide other electrical needs to begin stack operation. If the vehicle is currently in a regenerative braking mode, it may be possible to use the regenerative power to provide those electrical requirements and reduce the load on the battery.

SUMMARY OF THE INVENTION

In accordance with the teachings of the present invention, a system and method are disclosed for using regenerative braking power to start a fuel cell stack for system restart during a start/stop operation of a fuel cell hybrid vehicle. The method includes disconnecting the fuel cell stack from a high voltage bus for the start/stop operation and using regenerative braking power provided by an electric traction system to recharge a battery in the hybrid vehicle during the start/stop operation. The method also includes reconnecting the fuel cell stack to the high voltage bus and providing at least some of the regenerative braking power from the electric traction system to a compressor that provides cathode air to the fuel cell stack when the stack is reconnected to the high voltage bus at the end of the start/stop operation. A bi-directional DC converter selectively distributes the power to the compressor and the battery.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for using regenerative braking power to re-start a fuel cell stack during a start/stop mode is merely exemplary in nature, and is in no way intended to limit the invention or its applications or uses.

Figure 1:
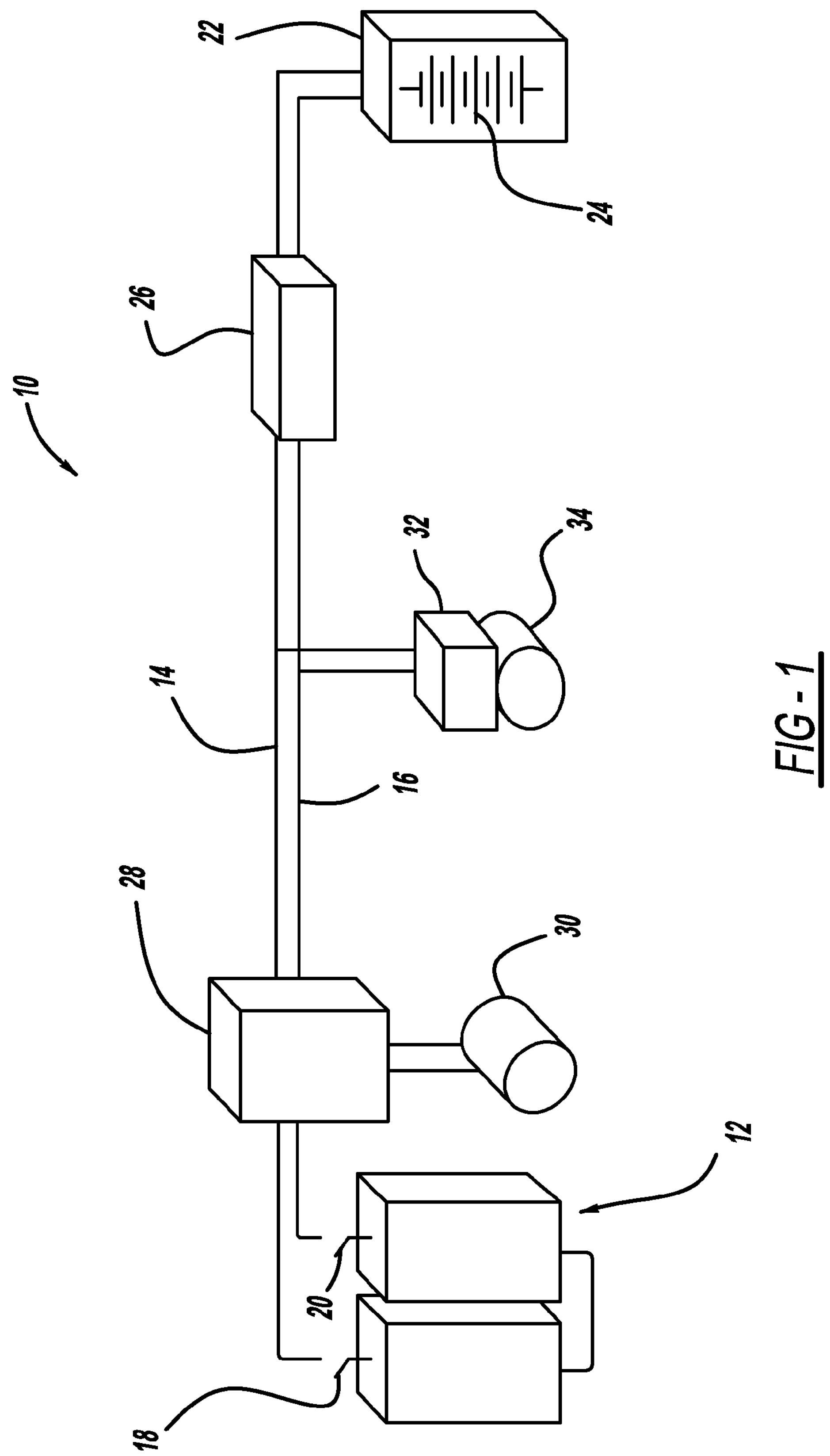
FIG. 1 is a schematic block diagram of an electrical system for a fuel cell vehicle.

FIG. 1 is a schematic block diagram of an electrical system 10 for a fuel cell hybrid vehicle. The system 10 includes a split fuel cell stack 12 electrically coupled to high voltage bus lines 14 and 16 through contactors 18 and 20, respectively. A high voltage battery 22 is also electrically coupled to the high voltage bus lines 14 and 16 where the battery 22 includes battery cells 24 electrically coupled in series. A bi-directional DC/DC converter (BDC) 26 is electrically coupled to the bus lines 14 and 16 to provide power to charge and discharge the battery 22, which is operating at a different voltage level that the fuel cell stack 12. The electrical system 10 includes a power management and distribution (PMD) device 28 electrically coupled to the bus lines 14 and 16 that connects additional system loads to the bus lines 14 and 16, such as an air compressor 30 that provides air to the cathode of the stack 12.

The electrical system 10 also includes a power inverter module (PIM) 32 electrically coupled to the bus lines 14 and 16 and an AC traction motor 34 that is part of an electric traction system (ETS) that drives the vehicle. The PIM 32 converts the DC voltage on the bus lines 14 and 16 to an AC voltage suitable for the traction motor 34. The traction motor 34 provides the traction power to operate the vehicle. During regenerative braking, rotational energy from the vehicle wheels (not shown) causes the traction motor 34 to operate as a generator that provides electrical current to the bus lines 14 and 16 which can be used by the BDC 26 to charge the battery 22 in a manner that is well understood by those skilled in the art.

Figure 2:
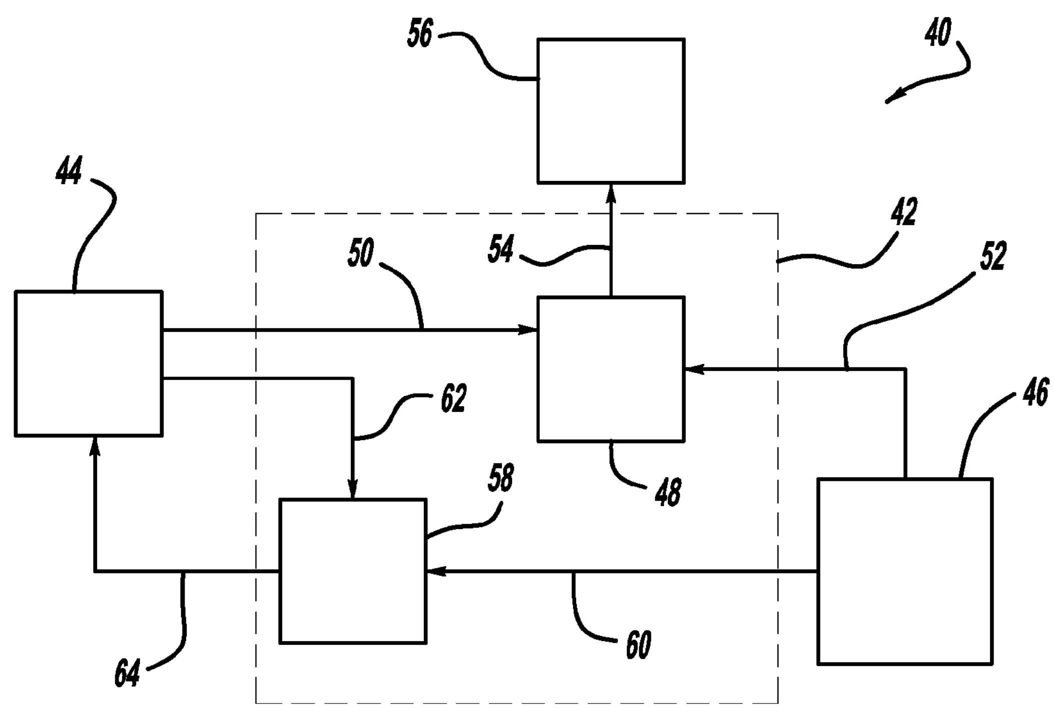
FIG. 2 is a schematic block diagram of a power control system for a fuel cell vehicle that includes control components for providing regenerative braking commands for restarting a fuel cell stack during a start/stop operation.

FIG. 2 is a schematic block diagram of a control system 40 for the electrical system 10 including a fuel cell power system (FCPS) controller 42 and a fuel cell system (FCS) controller 46. The system 40 also includes an electric traction system (ETS) 44 that represents the PIM 32 and the motor 34 in the system 10. The controller 42 includes a BDC power command calculation processor 48 that receives a power signal P_ETS from the ETS 44 on line 50 that identifies the power available from the regenerative braking of the traction motor 34 that is available to charge the battery 22.

When a request to re-start the fuel cell stack 12 is given for whatever reason during the stop/start operation, a power signal P_FCSStartup from the controller 46 on line 52 is provided that identifies how much power is required by the compressor 30 to provide the desired amount of air to the cathode side of the fuel cell stack 12 for the proper or desired airflow at a particular point in time. The processor 48 generates a command signal P_BDCCmd on line 54 that is sent to a BDC 56, representing the BDC 26, that instructs the BDC 56 to distribute the regenerative braking power received on the bus lines 14 and 16 to the battery 22 and to the compressor 30 in such a manner that the compressor 30 gets the power that it needs to spin up to provide the cathode air, where the remaining power is used to charge the battery 22. In other words, the processor 48 subtracts the power signal P_FCSStartup from the power signal P_ETS to identify how much of the regenerative braking power will be used to operate the compressor 30 and will instruct the BDC 56 to provide that power to the compressor 30 in the command signal P_BDCCmd.

The controller 42 also includes an ETS voltage limit calculation processor 58 that receives a stack voltage signal U_stack on line 60 from the controller 46 identifying the stack voltage and an ETS voltage signal U_ETS on line 62 from the ETS 44 that represents the voltage provided by the regenerative braking. To avoid a critical increase of the system voltage where more power is provided to the bus lines 14 and 16 by the regenerative braking power than is actually transferred to the high voltage battery 22 and/or the compressor 30 as a result of errors in calculations and the like, the processor 48 uses the stack voltage signal U_stack and the ETS voltage signal U_ETS to calculate an upper voltage limit U_ETSuplim on line 64 that identifies the most voltage that the ETS 44 can provide to the voltage bus lines 14 and 16 based on the current stack voltage. If the ETS voltage U_ETS reaches the upper voltage limit U_ETSuplim, the ETS 44 internally reduces the actual torque on the traction motor 34, and therefore, reduces the regenerated power to keep the regenerative braking voltage below the limit. The upper voltage limit U_ETSuplim on the line 64 is also used for system voltage control to reconnect the stack 12. To prevent contactor arcing, the voltage level on both sides of the stack contactors 18 and 20 needs to be in the same range during contactor closing. As soon as the stack 12 is supplied with hydrogen and oxygen for the stack restart, the stack voltage rises. If the stack voltage rises above the actual system voltage U_ETS, the upper voltage limit U_ETSuplim will be set to the actual stack voltage (U_ETSuplim=U_stack). The voltage level on the bus lines 14 and 16 will follow the stack voltage so that the contactors 18 and 20 can be closed to reconnect the stack 12.

Figure 3:
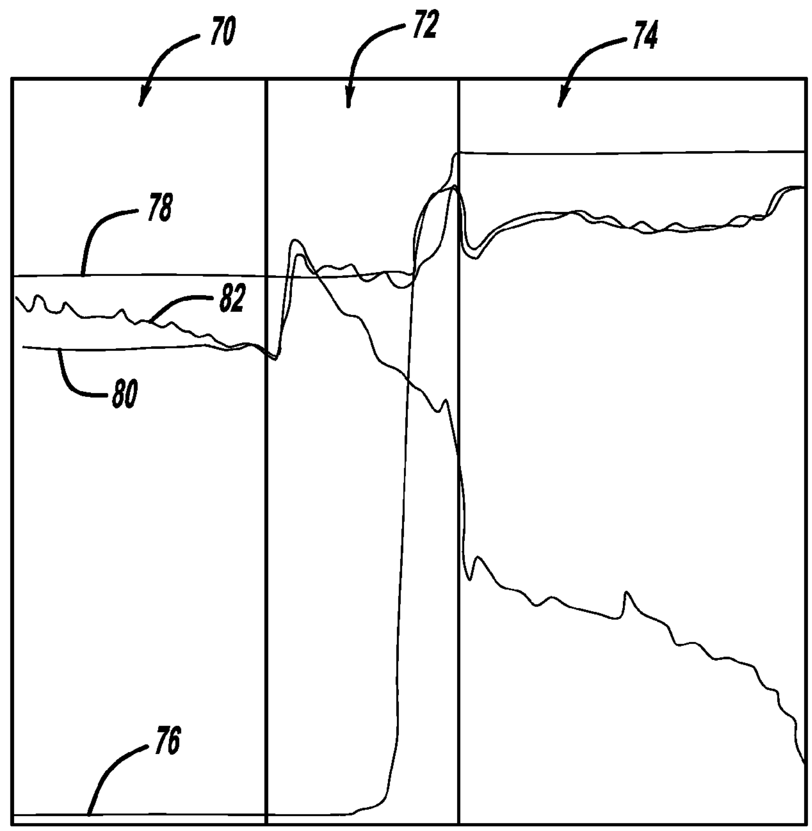
FIG. 3 is a graph showing stand-by, restart and hybrid operation for the power control system shown in FIG. 2.

FIG. 3 is a graph with time on the horizontal axis, voltage on the left vertical axis and power on the right vertical axis showing various relationships in the system 10 during stand-by in section 70, restart in section 72 and hybrid operation in section 74. Graph line 76 is the stack voltage, graph line 78 is the upper voltage limit, graph line 80 is the ETS voltage during regenerative braking and graph line 82 is the BDC power command in watts, which is negative to indicate that the power is being stored in the battery 22. These graph lines show how the BDC power command signal maintains the upper voltage limit during the restart section 72. As is apparent, during the restart section 72, the regenerative braking voltage is maintained below the upper voltage limit by the control system 40. Once the stack voltage rises during the restart section 72, it substantially follows the electric traction system voltage to prevent contact arcing.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for using regenerative braking power to start a fuel cell stack for system restart during a start/stop operation of a fuel cell hybrid vehicle, said method comprising:

disconnecting the fuel cell stack from a high voltage bus line for the start-stop operation;

using regenerative braking power provided by an electric traction system to recharge a battery in the hybrid vehicle when the fuel cell stack is disconnected; reconnecting the fuel cell stack to the high voltage bus line; providing at least some of the regenerative braking power from the electric traction system to a compressor that provides cathode air to a cathode side of the fuel cell stack when a request to re-start the fuel cell stack is received and the stack is reconnected to the high voltage bus line, wherein a power signal identifies how much power is required by the compressor to provide a desired amount of the cathode air to the cathode side, and wherein an amount of the regenerative braking power provided to the compressor is determined from the power signal which identifies how much power is required by the compressor, and an amount of the regenerative braking power available to recharge the battery is determined as a difference between an available regenerative braking power and the power required by the compressor; and determining an upper voltage limit that identifies a maximum bus voltage that is determined by a fuel cell stack voltage and preventing the electric traction system from providing regenerative braking power to the high voltage bus line that exceeds the upper voltage limit, wherein preventing the electric traction system from providing regenerative braking power includes reducing the regenerative braking power to a value below the maximum bus voltage.

2. The method according to claim 1 wherein providing at least some of the regenerative braking power to the compressor includes providing a command signal to a bi-directional DC converter that selectively distributes power to the compressor and the battery.

3. The method according to claim 1 further comprising maintaining the fuel cell stack voltage at an output of the fuel cell stack and a bus voltage on the high voltage bus line about the same to prevent stack contactor arcing.

4. The method according to claim 1 further comprising using the upper voltage limit to provide system voltage control when reconnecting the fuel cell stack to the high voltage bus line during restart.

5. A method for using regenerative braking power to start a fuel cell stack in a fuel cell hybrid vehicle, said method comprising:

providing regenerative braking power from an electric traction system to a high voltage bus;

selectively providing some of the regenerative braking power on the high voltage bus to a battery to charge the battery and providing some of the regenerative braking power to operate a compressor that provides cathode air to a cathode side of a fuel cell stack, wherein a power signal identifies how much power is required by the compressor to provide a desired amount of the cathode air to the cathode side, and wherein an amount of the regenerative braking power provided to the compressor is determined from the power signal which identifies how much power is required by the compressor, and an amount of the regenerative braking power available to recharge the battery is determined as a difference between an available regenerative braking power and the power required by the compressor; and determining an upper voltage limit that identifies a maximum bus voltage that is determined by a fuel cell stack voltage and preventing the electric traction system from providing regenerative braking power to the high voltage bus line that exceeds the upper voltage limit, wherein preventing the electric traction system from providing regenerative braking power includes reducing the regenerative braking power to a value below the maximum bus voltage.

6. The method according to claim 5 wherein selectively providing the regenerative braking power includes using a bi-directional DC converter to distribute the regenerative braking power to the battery and the compressor.

7. The method according to claim 5 further comprising maintaining the fuel cell stack voltage at an output of the fuel cell stack and a bus voltage on the high voltage bus line about the same to prevent stack contactor arcing.

8. The method according to claim 5 wherein the fuel cell stack is started during a start/stop operation.

9. The method according to claim 5 further comprising using the upper voltage limit to provide system voltage control when reconnecting the fuel cell stack to the high voltage bus line during restart.

10. A method for using regenerative braking power to start a fuel cell stack in a fuel cell hybrid vehicle, said method comprising:

providing regenerative braking power from an electric traction system to a high voltage bus;

selectively providing some of the regenerative braking power on the high voltage bus to a battery to charge the battery and providing some of the regenerative braking power to operate a compressor that provides cathode air to a cathode side of a fuel cell stack when a request to re-start the fuel cell stack is received and a power signal identifies how much power is required by the compressor, wherein selectively providing the regenerative braking power includes using a bi-directional DC converter to distribute the regenerative braking power to the battery and the compressor, and wherein an amount of the regenerative braking power provided to the compressor is determined from the power signal which identifies how much power is required by the compressor, and an amount of the regenerative braking power available to recharge the battery is determined as a difference between an available regenerative braking power from the electric traction system and the power required by the compressor;

defining an upper voltage limit that identifies a maximum bus voltage; and preventing the electric traction system from providing regenerative braking power to the high voltage bus line that exceeds the upper voltage limit.

11. The method according to claim 10 wherein determining the upper voltage limit includes using a fuel cell stack voltage.

12. The method according to claim 10 further comprising maintaining a fuel cell stack voltage at an output of the fuel cell stack and a bus voltage on the high voltage bus line about the same to prevent stack contactor arcing.

13. The method according to claim 10 wherein the fuel cell stack is started during a start/stop operation.

14. The method according to claim 10 further comprising using the upper voltage limit to provide system voltage control when reconnecting the fuel cell stack to the high voltage bus line during restart.

* * * * *